(12) United States Patent
Yon et al.

(10) Patent No.: US 7,259,193 B2
(45) Date of Patent: Aug. 21, 2007

(54) LIQUID INK COMPOSITION AND METHOD OF PRODUCING A LIQUID INK COMPOSITION

(75) Inventors: Kyung-yol Yon, Seongnam-si (KR); Nam-jeong Lee, Suwon-si (KR); Hae-ree Joo, Seoul (KR); Joong-hwan Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 370 days.

(21) Appl. No.: 10/945,995

(22) Filed: Sep. 22, 2004

(65) Prior Publication Data

US 2005/0075417 A1    Apr. 7, 2005

(30) Foreign Application Priority Data

Oct. 2, 2003    (KR) ...................... 10-2003-0068595

(51) Int. Cl.
  *C03G 17/00*    (2006.01)
  *C09D 5/00*    (2006.01)
(52) U.S. Cl. ........................ 523/160; 523/201; 523/161
(58) Field of Classification Search ................ 430/114; 523/160, 161, 201
  See application file for complete search history.

(56) References Cited

U.S. PATENT DOCUMENTS

| | | | |
|---|---|---|---|
| 5,260,255 A | 11/1993 | Sudo et al. | |
| 5,302,482 A | 4/1994 | Elmasry et al. | |
| 5,672,457 A | 9/1997 | Gibson et al. | |
| 5,698,616 A * | 12/1997 | Baker et al. | ................. 523/201 |
| 6,255,363 B1 | 7/2001 | Baker et al. | |
| 2004/0225030 A1* | 11/2004 | Yon et al. | .................... 523/160 |

FOREIGN PATENT DOCUMENTS

| | | |
|---|---|---|
| JP | 3-178483 | 8/1991 |
| JP | 3-294870 | 12/1991 |
| JP | 8-127171 | 5/1996 |
| JP | 8-258397 | 10/1996 |
| JP | 8-300808 | 11/1996 |
| KR | 2002-0036767 | 5/2002 |
| KR | 2002-0082415 | 10/2002 |

* cited by examiner

*Primary Examiner*—John L Goodrow
(74) *Attorney, Agent, or Firm*—Roylance, Abrams, Berdo & Goodman, L.L.P.

(57) ABSTRACT

A liquid ink composition includes a colorant, a charge control agent, an organosol, a carrier liquid, and a storage stabilizer. The storage stabilizer is a metal salt of a metal cation and an organic anion having 15 to 30 carbon atoms. The liquid ink composition is produced by a method of adding the storage stabilizer in an effective amount to improve the dispersibility and storage stability at high temperatures without deteriorating the electrical property and the optical density of the liquid ink composition. The storage stabilizer can be a metal salt of $C_{15}$ to $C_{30}$ alkyl carboxylate or a metal salt of a $C_{15}$ to $C_{30}$ alkyl sulfonate.

24 Claims, 1 Drawing Sheet

LIQUID INK COMPOSITION AND METHOD OF PRODUCING A LIQUID INK COMPOSITION

CROSS-REFERENCE TO RELATED APPLICATION

Figure 1:
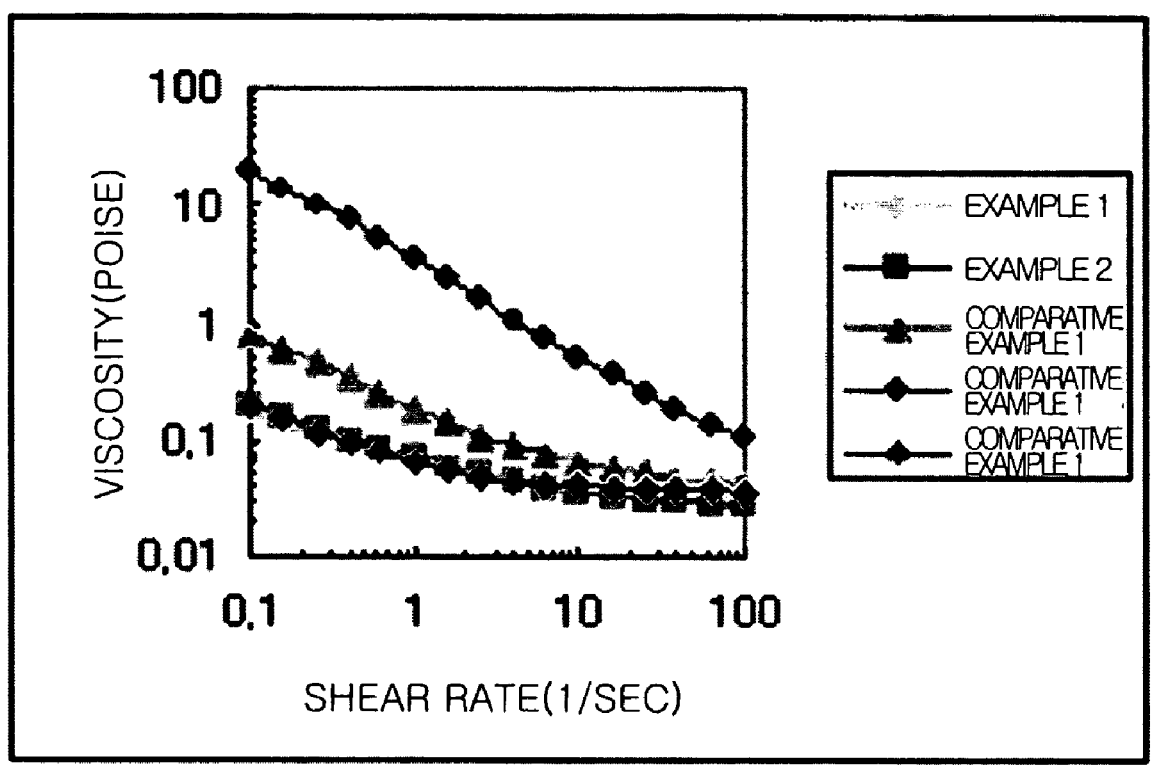

This application claims the priority of Korean Patent Application No. 2003-68595, filed Oct. 2, 2003 in the Korean Intellectual Property Office, the disclosure of which is incorporated herein by reference.

BACKGROUND OF THE INVENTION

1. Field of the Invention

The present invention generally relates to a liquid ink composition and a method of producing the composition. More specifically, the present invention relates to a liquid ink composition and a method for producing an ink composition that is capable of maintaining good characteristics and dissolves or inhibits the formation of ink clots during long term storage by adding a metal salt as a storage stabilizer to the ink composition.

2. Description of the Related Art

Liquid inks are widely used in offset, rotogravure, and ink jet printers and in electrophotographic image forming apparatuses. In the electrophotographic image forming apparatuses, such as copying machines, laser printers, and facsimile machines, liquid inks are used as the liquid toner or developer. Generally, the electrophotographic process includes forming a latent electrostatic image on a charged photoconductor by exposing the photoconductor to radiation according to a predetermined image pattern, contacting the photoconductor with a liquid developer to develop the image, and transferring the developed image onto the liquid developer receiving medium. The image transfer may be performed directly, or indirectly through an intermediate transport member. The developed image is fused permanently onto the receiving medium by heat and/or pressure.

The liquid toners may be classified into two types: a liquid toner generally prepared using general commercial resins and an organosol toner generally prepared using organosols. The organosol toner includes organosols added to a toner acting as a dispersant as well as a binder. U.S. Pat. No. 4,925,766 and U.S. Pat. No. 4,978,598 disclose a liquid electrophotographic toner including the organosol, and a liquid electrophotographic toner preparation method, respectively. As disclosed in these patents, the organosol toner is generally prepared by preparing a (co)polymeric graft stabilizer, preparing the organosol using the (co)polymeric graft stabilizer, and mixing and milling the organosol, the colorant, and additives.

The prepared organosol toner includes stabilized and charged toner particles having a diameter in the range of 0.1 to 5 μm so as to be used to produce a high-resolution image.

Meanwhile, the liquid ink has to be uniformly dispersed to produce a clear image when used in the image forming apparatus. Otherwise, clots may be formed in the inks and the development and the transfer of the image may not be carried out smoothly, thereby interfering with the production of a desired image.

The liquid ink also has to maintain dispersibility after a long storage life taking into consideration the storage time spent before the product is purchased and the actual usage time of the product.

However, while providing the high-resolution image, the organosol toner has shortcomings during the storage. To prepare the organosol toner, the organosol, the colorant, and the charge control agent are put into a carrier liquid and milled by applying a physical force using a milling apparatus at a predetermined temperature. The organosol serves as the dispersant to combine the colorant, the charge control agent, and the additional agents, thus forming the toner particles. For a short period of time at normal temperature, the prepared toner does not generate a considerable amount of the clots of the toner particles. Even if the toner particles is clotted and deposited, it is in small amount and can be dispersed through a simple physical method such as by shaking.

During long term storage and at high temperature, especially at temperatures above the glass transition temperature of an organosol core, the toner particles may combine with each other and be deposited, forming a separate layer in the carrier liquid. Once the toner particles clot and form a separate layer and sediment in the carrier liquid, it is difficult to disperse to the original dispersed state even with excessive physical force. In actual use, it is inevitable that the liquid toner will be stored for a long time. Furthermore, the requirement for high-temperatures to fix the image affects the liquid toner that is stored in the image forming apparatus.

The non-dispersed toner having sediments of the toner particles does not smoothly flow into a developing apparatus, and the printing may not be properly performed. Even if the image is printed, it is difficult to produce a clear image since the liquid toner particles are not completely dispersed.

Accordingly, even in the liquid ink having the organosol as the dispersant to disperse the ink particles, the quality of the liquid ink is not guaranteed if the liquid ink is exposed to high temperatures during long term storage. As a result, there is a need for a liquid ink having an organosol that is stable during long term storage and maintains a uniform quality.

SUMMARY OF THE INVENTION

An aspect of the present invention is to provide a liquid ink composition containing a storage stabilizer and to a method of producing the ink composition. Another aspect of the invention is to provide a stable liquid ink composition that maintains good characteristics of the ink and prevents clotting even at a high temperatures and prolonged storage times.

To achieve the above aspects of the present invention, the liquid ink composition includes a colorant, a charge control agent, an organosol, a carrier liquid, and a storage stabilizer. The storage stabilizer is a metal salt produced by bonding a metal cation and an organic anion having 15 to 30 carbon atoms. In one embodiment, the anion includes a $C_{15}$ to $C_{30}$ alkyl group.

The organosol includes a graft stabilizer and a thermoplastic (co)polymeric core. The graft stabilizer contains (meth)acrylic monomer of $C_6$ to $C_{30}$ and the thermoplastic (co)polymeric core contains (meth)acrylic monomer $C_4$ to $C_{30}$.

In one embodiment of the present invention, the thermoplastic (co)polymeric core has a glass transition temperature in a range of 50° C. to 70° C.

The metal cation is selected from the group consisting of Ba (II), Ca (II), Mn (II), Zn (II), Zr (IV), Cu (II), Al (III), Cr (III), Fe (II), Fe (III), Sb (III), Bi (III), Co (II), La (III), Pb (II), Mg (II), Mo (III), Ni (II), Ag (I), Sr (II), Sn (IV), V (V), Y (III), and Ti (IV). Preferably, the metal cation is Al (III). The organic anion is selected from the group consisting of a carboxylate and a sulfonate derived from a $C_{15}$ to $C_{30}$ fatty acid. In one embodiment, the organic anion may be a carboxylate derived from stearic acid.

The liquid ink composition includes the storage stabilizer in an amount ranging from about 0.1 parts by weight to about 10 parts by weight based on 100 parts by weight of the liquid ink solids.

According to one aspect of the present invention, the method for preparing the liquid ink composition includes polymerizing a mixture of a carrier liquid, a polymerizable (meth)acrylic monomer having 6 to 30 carbon atoms, and a polymerization initiator to produce the graft stabilizer; polymerizing a mixture of the graft stabilizer, the carrier liquid, a (meth)acrylic monomer having 4 to 30 carbon atoms as a monomer for forming a thermoplastic (co)polymeric core, and a polymerization initiator to produce an organosol; and mixing and milling the organosol, a colorant, the carrier liquid, and a charge control agent, and a storage stabilizer to produce the liquid ink composition. The storage stabilizer is a metal salt of a metal cation and an organic anion having 15 to 30 carbon atoms.

The method for producing the liquid ink composition adds a storage stabilizer where the stabilizer is a divalent or trivalent metal salt. The metal cation is selected from the group consisting of Ba (II), Ca (II), Mn (II), Zn (II), Zr (IV), Cu (II), Al (III), Cr (III), Fe (II), Fe (III), Sb (III), Bi (III), Co (II), La (III), Pb (II), Mg (II), Mo (III), Ni (II), Ag (I), Sr (II), Sn (IV), V (V), Y (III), and Ti (IV). The metal cation may be Al (III). The organic anion is selected from the group consisting of a carboxylate and sulfonate derived from a $C_{15}$ to $C_{30}$ fatty acid. Preferably, the organic anion is a carboxylate derived from stearic acid. In other embodiments, the storage stabilizer can be a mixture of a carboxylate and a sulfonate metal salt.

These and/or other aspects and advantages of the invention will become apparent and more readily appreciated from the following description of the embodiments, taken in conjunction with the accompanying drawing figure.

BRIEF DESCRIPTION OF THE DRAWING FIGURE

The following is a brief description of the drawing, in which:

FIG. 1 is a graph showing the results of viscosity testings of liquid ink compositions according to embodiments of the present invention.

DETAILED DESCRIPTION OF THE EXEMPLARY EMBODIMENTS

Hereinafter, the present invention will be described in greater detail in reference to Examples, Comparative Examples, and the annexed drawing.

According to one embodiment of the present invention, a liquid ink composition includes a colorant, a charge control agent, an organosol, a carrier liquid, and a storage stabilizer. The liquid ink composition of the invention is a heat activated composition that is set and fixed onto a substrate such as paper by the application of heat. The liquid ink composition is suitable for use in printers, photocopy machines, facsimile machines, and the like.

The colorant can be a well-known colorant such as phthalocyanine blue, aniline blue, ultramarine blue, quinoline yellow, monoarylide yellow, diarylide yellow, arylamide yellow, Dupont oil red, azo red, quinacridone magenta, lamp black, rose Bengal, carbon black and a mixture of two or more thereof. It is to be understood that colorants are not limited to these examples The charge control agent provides uniform charge polarity for a developer. The developer is the toner particles in the liquid ink composition. The charge control agent may be incorporated into the organosol or the colorant particles by a variety of methods, such as chemically reacting the charge control agent with the developer particles, chemically or physically adsorbing the charge control agent onto the developer particles, or chelating the charge control agent to a functional group incorporated into the toner particles. It is preferred to incorporate the charge control agent by chelating the charge control agent with the graft stabilizer of the organosol. The conventional quantity of the charge control agent is used in the electrophotographic image forming apparatus or may be set in consideration of factors such as composition of the organosol, molecular weight of the organosol, particle size of the organosol, type of the colorant, ratio of the organosol and the colorant, and so on.

The charge control agent can be any charge control agent as known in the art. The known charge control agents can be used in the Examples of the present invention. For example, the charge control agent may be introduced in the form of metal salts containing polyvalent metal ions and organic anions as the counterion. Examples of suitable metal ions for the charge control agents include Ba (II), Ca (II), Mn (II), Zn (II), Zr (IV), Cu (II), Al (III), Cr (III), Fe (II), Fe (III), Sb (III), Bi (III), Co (II), La (III), Pb (II), Mg (II), Mo (III), Ni (II), Ag (I), Sr (II), Sn (IV), V (V), Y (III), and Ti (IV). Examples of suitable organic anions include carboxylates or sulfonates having 6 to 8 carbon atoms. The organic anions are typically derived from aliphatic or aromatic carboxylic acids, or aliphatic or aromatic sulfonic acids. Preferably, the carboxylates or sulfonates are derived from $C_6$ to $C_8$ fatty acids such as octanoic acids. It is most preferred to use zirconium salts of octanoic acid as the charge control agent, such as Zirconium HEX-CEM of Mooney Chemicals Co. in Cleveland, Ohio (U.S.A).

The organosol bonds the liquid ink particles. The organosol also performs complex functions as a binder and as a dispersant to disperse the liquid ink particles in the carrier liquid. According to an embodiment of the present invention, the organosol comprises a graft stabilizer and a thermoplastic (co)polymeric core.

The graft stabilizer has a thermoplastic core produced by polymerizing an ethylenically unsaturated monomer and particularly (meth)acrylic monomers having 6 to 30 carbon atoms. Suitable monomers include, for example, alkyl acrylates having alkyl chains such as tetradecylacrylates, pentadecylacrylates, hexadecylacrylates, heptadecylacrylates, and octadecylacrylates or cyclo-alkyl rings such as trimethylcyclohexylacrylates; alkyl methacrylates; ethylene; propylene; acrylamide; arly acrylates and aryl methacrylates; high molecular weight alpha olefins; linear or branched alkyl vinyl ethers or vinyl esters; long chain alkyl isocynates; unsaturated long chain polyesters; polysiloxanes or polysilanes; polymerizable natural waxes; and polymerizable synthetic waxes. It will be understood that the monomers are not limited to these monomers and that other monomers can be used as known by one skilled in the art. The graft stabilizer is prepared by mixing the monomer component for forming the graft stabilizer and a polymerization initiator in the carrier liquid and thereafter polymerizing the monomer component.

The carrier liquid can be any suitable carrier as known in the art for polymerizing ethylenically unsaturated monomers. Examples of suitable carrier liquids include aliphatic hydrocarbons such as n-pentane, hexane, and heptane; cyclo hydrocarbons such as cyclopentane and cyclohexane; aromatic hydrocarbons such as benzene, toluene, and xylene; halogenated hydrocarbon solvents such as chlorinated alkanes, fluorinated alkanes, and chlorofluorocarbons; silicone oils; and waxes such as polyethylene wax, branched paraffin wax and oils, stearic acid amide and mixtures thereof. Other liquid carriers can be used as known in the art.

The polymerization initiator is an additive to carry out the additional polymerization of a monomer component by free radical polymerization through a radical decomposition using heat or a reducing agent. Examples of the polymerization initiator include water or fat-soluble persulfates, peroxides, and azobis compounds. More specifically, suitable polymerization initiators include potassium persulfate, ammonium persulfate, t-butyl hydroperoxide, hydrogen peroxide, azobisisobutyronitrile (AIBN), Rongalite, and potassium metabisulfite. The polymerization initiators can be used as a single compound or as a mixture of two or more of the compounds.

To prepare the organosol, the prepared graft stabilizer is mixed in the carrier liquid together with (meth)acrylic monomers having 4 to 30 carbon atoms as the polymerization monomers for the thermoplastic (co)polymeric core, and the polymerization initiator. The resulting mixture is then polymerized to obtain the organosol.

Examples of the polymerization monomer component for the thermoplastic (co)polymeric core include for example (meth)acrylates such as methyl acrylate, ethyl acrylate, butyl acrylate, methyl methacrylate, ethyl methacrylate, butyl methacrylate; (meth)acrylates having an aliphatic amino group such as N,N-dimethylaminoethyl(meth)acrylates, N,N-diethylaminoethyl(meth)acrylate, N,N-dibutylaminoethyl(meth)acrylate, N,N-hydroxyethylaminoethyl(meth) acrylate, N-benzyl,N-ethylaminoethyl(meth)acrylate, N,N-dibenzylaminoethyl(meth)acrylate, N-octyl,N,N-dihexylaminoethyl(meth)acrylate; nitrogen-containing heterocyclic vinyl monomers such as N-vinylimidazole, N-vinylindazole, N-vinyltetrazole, 2-vinylpyridine, 4-vinylpyridine, 2-methyl-5-vinylpyridine, 2-vinylquinoline, 4-vinylquinoline, 2-vinylpyrazine, 2-vinyloxazole, 2-vinylbenzoxazole; N-vinyl substituted ring-like amide monomers such as N-vinylpyrrolidone, N-vinylpiperidone, N-vinyloxazolidone; N-vinyl substituted ring-like amide monomers such as N-methylacrylamide, N-octylacrylamide, N-vinylpiperidone, N-vinyloxazolidone; (meth)acrylamides such as N-methylacrylamide, N-octylacrylamide, N-phenylmethacrylamide, N-cyclohexylacrylamide, N-phenylethylacrylamide, N-p-methoxy-phenylacrylamide, acrylamide, N,N-dimethylacrylamide, N,N-dibutylacrylamide, N-methyl, N-phenylacrylamide, piperidine acrylate, morpholine acrylate; aromatic substituted ethylenically unsaturated monomers including amino groups such as dimethylaminostyrene, diethylaminostyrene, diethylaminomethylstyrene, dioctylaminostyrene; nitrogen-containing vinylether monomers such as vinyl-N-ethyl-N-phenylaminoethylether, vinyl-N-butyl-N-phenylaminoethylether, triethanolaminedivinylether, vinyldiphenylaminoethylether, vinylpyrrolydylaminoether, vinyl-beta-morpolinoethylether, N-vinylhydroxyethylbenzamide, m-aminophenylvinylether; and acrylates and methacrylates. Other monomer components can also be used as known in the art.

The graft stabilizer may be chemically bonded to the thermoplastic (co)polymeric core such as by graft polymerizing onto the core, or adsorbed on the core to remain as a whole with the thermoplastic (co)polymeric core. The grafting method generally includes random grafting of multifunctional groups by free radical polymerization; ring-opening polymerization of cyclo-ether, ester amide or acetal groups; epoxization; reaction with hydroxy or amino chain transition agents and unsaturated terminal groups; esterification (i.e., glycidyl methacrylate esterified with methacrylic acid in the presence of a tertiary-amine catalyst); and condensation polymerization. Other polymerization methods as known in the art can also be used.

The organosol is prepared by copolymerizing the graft stabilizer and the polymerization monomer component for the thermoplastic (co)polymeric core. Preferably, the thermoplastic (co)polymeric core of the organosol has the glass transition temperature Tg in the range of 50° C. to 70° C. The selected glass transition temperature Tg of the (co) polymer can be obtained using a known value of high molecular weight monopolymer and a fox equation as shown in Formula 1. The fox equation is presented on pages 54-55 in the document by A. W. Wicks, F. N. Johnes and S. P. Pappa on Organic Coatings, 1, John Wiley & Sons, New York, 1992. Referring to Formula 1, 'Wi' denotes a weight fraction of the monomer 'i' and 'Tgi' denotes the glass transition temperature of the high molecular monopolymer of the monomer 'i'.

$$\frac{1}{Tg} = \frac{w1}{Tg1} + \frac{w2}{Tg2} \qquad \text{[Formula 1]}$$

Using the Formula 1, the glass transition temperature of the organosol thermoplastic core can be adjusted to a desired glass transition temperature by selecting the glass transition temperature of the polymerization monomer for the thermoplastic (co)polymeric core and the weight fraction. Specifically, a desired glass transition temperature of the organosol and the glass transition temperatures of the monomers are selected by determining monomers '1' and '2' to be used for the polymerization. Then, using the Formula 1, each weight fraction of the monomers '1' and '2' is determined. Table 1 shows the glass transition temperature of the monopolymer of the monomers that can be used as the polymerization monomer for the thermoplastic (co)polymeric core.

TABLE 1

| Monomer | Glass transition temperature (° C.) |
|---|---|
| t-butyl methacrylate | 107 |
| n-butyl methacrylate | 20 |
| n-butyl acrylate | −55 |
| ethyl acrylate | −24 |
| methyl methacrylate | 105 |
| ethyl methacrylate | 66 |
| lauryl methacrylate | −65 |

The glass transition temperature of the organosol thermoplastic core depends on the characteristics of the imaging method using the liquid ink composition. The glass transition temperature is also selected to provide the desired storage stability, dispersibility, development property, transference, and the ability to fix the liquid ink onto a transfer medium or substrate, and the durability of the printed image. When the glass transition temperature is too low, the storage stability may be lowered and the solidity and durability of the image may be lowered so that the printed image is easily scratched and sticks to each other. In cases where the glass transition temperature is too high, the cohesion of an ink layer between an organic photoconductor and an intermediate transport member may be reduced which can affect the image, and excessive energy may be required for fixing the image on the paper or other substrate. Hence, preferably, the glass transition temperature of the organosol thermoplastic core is in a range of 50° C. to 70° C.

The long storage stability of the liquid ink is improved by the addition of a storage stabilizer to the liquid ink composition. Preferably, the storage stabilizer is an organo metal salt having a metal cation and organic anion. The organic anion preferably has 15-30 carbon atoms. In preferred embodiments, the organic anion has a $C_{15}$ to $C_{30}$ alkyl group.

The metal cation of the storage stabilizer is selected from the group consisting of Ba (II), Ca (II), Mn (II), Zn (II), Zr (IV), Cu (II), Al (III), Cr (III), Fe (II), Fe (III), Sb (III), Bi (III), Co (II), La (III), Pb (II), Mg (II), Mo (III), Ni (II), Ag (I), Sr (II), Sn (IV), V (V), Y (III), and Ti (IV). In one preferred embodiment, the metal cation is Al (III).

The organic anion of the storage stabilizer may be a carboxylate or a sulfonate derived from $C_{15}$ to $C_{30}$ fatty acids. Preferably, the anion is a carboxylate, such as a stearate derived from stearic acid $(CH_3(CH_2)_{16}COOH)$.

Examples of the metal carboxylate salts suitable for use as the storage stabilizer are identified by the formula:

[Chemical Formula 1]

$$M_x\text{—}[\text{—}O\text{—}OC\text{—}(CH_2)_n\text{—}CH_3]_y$$

In the Chemical Formula 1, 'M' denotes a metal ion selected from the group consisting of Ba, Ca, Mn, Zn, Zr, Cu, Al, Cr, Fe, Sb, Bi, Co, La, Pb, Mg, Mo, Ni, Ag, Sr, Sn, V, and Y, 'x' and 'y' respectively denote the metal cation and degree of carboxylate and are based on valence of the metal and the anion, and 'n' denotes an integer between 13 and 28. In this embodiment, the storage stabilizer is a divalent or trivalent metal salt of a carboxylate anion having 15 to 30 carbon atoms. The sulfonate storage stabilizers are identified by the formula:

[Chemical Formula 2]

$$M_x\text{—}[\text{—}O_3S\text{—}(CH_2)_n\text{—}CH_3]_y$$

In the Chemical Formula 2, 'M' denotes a metal selected from the group consisting of Ba, Ca, Mn, Zn, Zr, Cu, Al, Cr, Fe, Sb, Bi, Co, La, Pb, Mg, Mo, Ni, Ag, Sr, Sn, V, and Y, 'x' and 'y' respectively denote the metal cation and degree of sulfonate, and n denotes an integer between 13 and 28. In this embodiment, the storage stabilizer is a divalent or trivalent metal salt of a sulfonate anion having 14 to 29 carbon atoms. In other embodiments, the storage stabilizer includes a sulfonate anion having 15 to 30 carbon atoms.

Aluminum stearate, which is the metal salt formed from an aluminum ion and a stearate cation, is a carboxylate having a long hydrocarbon chain. Aluminum stearate is a preferred storage stabilizer since aluminum stearate increases the dispersibility of the liquid toner particles and is compatible with the carrier liquid.

The metal salts used for the charge control agent are different from the metal salts used for the storage stabilizer with respect to the organic anions. The organic anion of the metal salt for the charge control agent is a carboxylate or sulfonate having 6 to 8 carbons. In contrast, the organic anion of the metal salt for the storage stabilizer is a carboxylate or sulfonate having at least 15 carbons, and preferably 15 to 30 carbon atoms. Due to difficulty in charging, an organic anion having more than 15 carbons is not used for the charge control agent. Thus, function of the metal salt to be used may change according to the number of carbons of the organic anion.

The storage stabilizer bonds with colorant particles or organosol particles through various methods. For example, the storage stabilizer may be bonded with colorant particles or organosol particles through a chemical reaction, a chemical or physical absorption, or by chelation with a functional group. The storage stabilizer enables the long-term storage by maintaining a uniform bond of the liquid ink particles.

The liquid ink composition according to the present invention can be prepared by mixing and milling the organosol, the colorant, the carrier liquid, the charge control, and the storage stabilizer.

A method for preparing the liquid ink composition according to the present invention is described with reference to the Examples.

EXAMPLES OF THE PRESENT INVENTION

Example 1

Preparation of Graft Stabilizer 2557 g of Norpar 12 (Exxon Co.), 849 g of trimethylcyclohexyl methacrylate (TCHMA), 27 g of 2-hydroxyethyl methacrylate (HEMA), 13 g of polymerization initiator (dimethyl, 2,2'-azobis (2-methylpropinate): Trademark-V601, and Wako Chem (Wako Chem Co., Japan) were mixed and stirred in a nitrogen gas atmosphere at 70° C. and at a speed of 250 rpm for 16 hours to carry out the polymerization reaction. The resulting reacted compound was then stirred at a speed of 250 rpm and heated at 90° C. for 1 hour to remove residual polymerization initiator. To the resulting reacted compound, 14 g of dibutyltin dilaurate (DBTDL, Aldrich Chemical Co.) and 41 g of 3-isoprophenyl dimethylbenzyl isocyanate (TMI, CYTEC Industries Co.) were added. The mixture was then stirred at a speed of 250 rpm in a nitrogen gas atmosphere at 70° C. and reacted for 6 hours to produce the graft stabilizer. The resulting graft stabilizer is a copolymer of HEMA and TCHMA with TMI side chains.

Preparation of the Organosol 187 g of the prepared graft stabilizer, 2943 g of Norpar 12 (Exxon Co.), 325 g of ethyl methacrylate (EMA), 49 g of ethyl acrylate (EA), 6 g of polymerization initiator (dimethyl 2,2'-azobis (2-methylpropionate): Trademark-V601, Wako Chem Co., Japan) were mixed and stirred at a speed of 250 rpm in a nitrogen gas atmosphere at a temperature of 75° C. and allowed for react for 16 hours to produce the organosol. The resulting organosol was then cooled to an ambient temperature and 350 g of n-heptane was added to the cooled organosol. Finally, the organosol was prepared by removing the residual monomer from the compound, using a rotary evaporator having a dry ice/acetone condenser and operating under a vacuum of 15 mmHg at 97° C. The prepared organosol was cooled to an ambient temperature into an opaque liquid dispersed state.

Preparation of Liquid Ink 9.4 g of cyan dye PB 15:4 (Sun Chemical Co.), 435 g of prepared organosol, 153 g of Norpar 12 (Exxon Co.), 2.75 g of zirconium-HEXCEM, and 0.7 g of aluminum stearate were put into a milling vessel having an attritor form, and 1200 g of zirconium beads were added thereto. The resulting mixture was then stirred at a speed of 4500 rpm and milled at 42° C. for 2.5 hours to obtain 600 g of the liquid ink.

Example 2

In this Example, a liquid ink was prepared using the organosol of Example 1.

Preparation of Liquid Ink 9.4 g of cyan dye PB 15:4 (Sun Chemical Co.), 435 g of organosol prepared as in Example 1, 153 g of Norpar 12 (Exxon Co.), 2.75 g of zirconium-HEXCEM, and 1.98 g of aluminum stearate were put into a milling vessel having an attritor form, and 1200 g of zirconium beads were added thereto. The resulting mixture was then stirred at a speed of 4500 rpm and milled at 42° C. for 2.5 hours to prepare 600 g of the liquid ink.

Comparative Example 1

In this Example, a liquid ink was prepared using the organosol of Example 1.

Preparation of Liquid Ink 9.4 g of cyan dye PB 15:4 (Sun Chemical Co.), 435 g of the organosol of Example 1, 153 g of Norpar 12 (Exxon Co.), 2.75 g of zirconium-HEXCEM, and 3.30 g of aluminum stearate were put into a milling vessel having an attritor form, and 1200 g of zirconium beads were added thereto. The resulting mixture was then stirred at a speed of 5000 rpm and milled in 42° C. for 3 hours to obtain 600 g of liquid ink.

Comparative Example 2

In this Example, a liquid ink was prepared using the organosol of Example 1.

Preparation of Liquid Ink 9.4 g of cyan dye PB 15:4 (Sun Chemical Co.), 435 g of the prepared organosol of Example 1, 153 g of Norpar 12 (Exxon Co.), 2.75 g of zirconium-HEXCEM, and 6.60 g of aluminum stearate were put into a milling vessel having an attritor form, and 1200 g of zirconium beads were added thereto. The resulting mixture was then stirred at a speed of 5000 rpm and milled in 42° C. for 3.5 hours to obtain 600 g of liquid ink.

Comparative Example 3

In this Example, a liquid ink was prepared using the organosol of Example 1.

Preparation of Liquid Ink 9.4 g of cyan dye PB 15:4 (Sun Chemical Co.), 435 g of the prepared organosol of Example 1, 153 g of Norpar 12 (Exxon Co.), and 2.75 g of zirconium-HEXCEM were put into a milling vessel having an attritor form, and 1200 g of zirconium beads were added thereto. The resulting mixture was then stirred at a speed of 4500 rpm and milled at 42° C. for 2.5 hours to obtain 600 g of liquid ink.

{Testing and Test Results}

Testing (1) Viscosity Test

For the viscosity test, Advanced Rheometric Expansion System (model: ARES-100FRT) and couette geometry were used as a fixture. The viscosity was measured in a condition that steady shear rate sweeps are in a range of 0.1 to 100 rad/s.

(2) Electrical Property Test

The conductivity and Q/M (coulomb per unit weight of liquid ink) of liquid ink were tested using a Model 627 of Scientifica Co. conductivity meter.

(3) Optical Density Test

After developing the liquid toner on the organic photo-conductor drum, the image on the drum was taped using a SpectroEye Model CH-8105 from Gretag Macbeth Co. to test the optical density of image area.

(4) High Temperature Storage Stability Test

The weight of clotted inks was tested in two cases. In one test, the ink was placed in an oven at 50° C. for one day and then stored at room temperature for 6 hours. In the other test, the ink was placed in an oven at 50° C. for 6 days and then stored at room temperature for 6 hours.

Test Results

Viscosity Test Results

FIG. 1 is a graph showing the viscosity test results, in which the vertical axis represents the viscosity and the horizontal axis represents the shear rate with respect to test samples of the Examples 1, 2 and the Comparative Examples 1 to 3.

As shown in FIG. 1, the liquid inks of Examples 1 and 2 having an effective amount of aluminum stearatehave a lower viscosity compared to the liquid ink of Comparative Example 3 which has no aluminum stearate. However, the viscosity of the liquid inks of Comparative Examples 1 and 2, increase according to the amount of aluminum stearate added to the liquid ink. Accordingly, the dispersibility of the liquid ink was enhanced by the addition of an effective amount of aluminum stearate, and the viscosity of the liquid ink decreased. On the other hand, an excessive amount of aluminum stearates added to the liquid ink resulted in clotting of the aluminum stearate. Thus, an excessive amount of the aluminum stearate did not provide the stabilizing effect, disrupted the dispersion and notably increased the viscosity of the liquid ink.

Test Results of Electrical Property, Optical Density, and High Temperature Storage Stability Table 2 shows the test results of the electrical property, the optical density, and the high temperature storage stability of the liquid ink according to the Examples and Comparative Examples.

TABLE 2

| Test results | Conductivity (pMho/cm at 8%) | Q/M (μ C/g) | OD of image area | High temperature storage stability (weight of clotted inks, g) | |
|---|---|---|---|---|---|
| | | | | laid for 1 day | laid for 6 days |
| Example 1 | 165 | 210 | 1.87 | 0 | 15 |
| Example 2 | 174 | 285 | 1.87 | 0 | 5 |
| Comparative Example 1 | 196 | 281 | 1.56 | 0 | 18 |
| Comparative Example 2 | 122 | 157 | 1.23 | 0 | 4 |
| Comparative Example 3 | 169 | 211 | 1.86 | 0 | 27 |

The conductivity and Q/M, which indicate the electrical property of the liquid ink, are not much different from those of the Examples 1, 2 and the Comparative Example 3. The conductivity and Q/M increases or decreases to some extent according to the amount of added aluminum stearate. Hence, by adding an effective amount of aluminum stearate, the electrical property of the liquid ink can be maintained.

The greater value of the optical density indicates a clear image. According to the test results of the optical density of the image area, while the optical density value did not vary to a great extent in the Examples 1, 2 and the Comparative Example 3, the optical density value decreased to a great extent in the Comparative Examples 1 and 2. As a result, while an excessive amount of aluminum stearate decreased the optical density value, an adequate amount of aluminum stearate enabled the clear image to be maintained.

Table 2 also shows the test result of the long storage stability at a high temperature. The ink, which was placed in a high temperature atmosphere for 1 day, did not have clots. Meanwhile, ink placed in an atmosphere at a high temperature for 6 days, as for the Comparative Example 3 having no aluminum stearate, the weight of the clotted inks was 27 g. However, Table 2 shows that the weight of the clots greatly decreased in the liquid inks of Examples 1, 2 and Comparative Examples 1, 2. Except for Comparative Example 3, the clotted inks of Examples 1 and 2 and Comparative Examples 1 and 2, can be easily dispersed through a simple shaking.

According to the test results, the liquid ink containing an effective amount of the aluminum stearate shows no significant difference in the electrical property and the optical density of the image area, but has a decreased viscosity and is relatively stable storage at high temperatures, compared to the liquid ink having no aluminum stearate. On the other hand, the liquid ink having an effective amount of aluminum stearate added, has improved storage stability at high temperatures, but has an increased viscosity and a decrease in the optical density, compared to the liquid ink having no aluminum stearate. As a result, the liquid ink having an effective amount of aluminum stearate can maintain a desired ink aptitude and enhance the storage stability at high temperatures.

According to an embodiment of the present invention, by adequately adding the colorant, the charge control agent, the organosol, the carrier liquid, and the storage stabilizer, the liquid ink composition and the preparation method thereof can maintain the high ink quality, while decreasing the viscosity and enhancing the long storage stability at high temperatures.

Although a few embodiments of the present invention have been shown and described, the present invention is not limited to the disclosed embodiments. Rather, it would be appreciated by those skilled in the art that changes and modifications may be made to the disclosed embodiments without departing from the principles and spirit of the invention, as defined by the claims and the equivalents thereof.

What is claimed is:

1. A liquid ink composition comprising:
   a colorant;
   a charge control agent comprising a metal carboxylate or metal sulfonate having 6 to 8 carbon atoms;
   an organosol;
   a carrier liquid; and
   a storage stabilizer dispersed in the carrier liquid in an amount effective to stabilize the ink composition,
   wherein said storage stabilizer is a metal salt of a metal cation and an organic anion having 15 to 30 carbon atoms.

2. The liquid ink composition of claim 1, wherein the organosol comprises:
   a graft stabilizer and a thermoplastic (co)polymeric core, wherein said graft stabilizer is obtained by the polymerization of a (meth)acrylic monomer component having 6 to 30 carbon atoms and where said thermoplastic (co)polymeric core is obtained by the polymerization of a (meth)acrylic monomer component having 4 to 30 carbon atoms.

3. The liquid ink composition of claim 2, wherein said thermoplastic (co)polymeric core has a glass transition temperature in a range of 50° C. to 70° C.

4. The liquid ink composition of claim 1, wherein said metal cation is selected from the group consisting of Ba (II), Ca (II), Mn (Ii), Zn (II), Zr (LV), Cu (II), Al (III), Cr (III), Fe (II), Fe (III), Sb (III), Bi (III), Co (II), La (III), Pb (II), Mg (II), Mo (III), Ni (II), Ag (I), Sr (II), Sn (IV), V (V), Y (III), and Ti (IV).

5. The liquid ink composition of claim 4, wherein the metal cation is Al (III).

6. The liquid ink composition of claim 1, wherein said organic anion is selected from the group consisting of carboxylates and sulfonates.

7. The liquid ink composition of claim 6, wherein carboxylates and sulfonates are derived from a $C_{15}$ to $C_{30}$ fatty acid.

8. The liquid ink composition of claim 6, wherein said organic anion is a carboxylate derived from stearic acid.

9. The liquid ink composition of claim 1, wherein said storage stabilizer is a alkyl carboxylate or an ailcyl sulfonate.

10. The liquid ink composition of claim 1, wherein said storage stabilizer is included in the composition in an amount of 0.1 parts by weight to 10 parts by weight based on 100 parts by weight of liquid ink solids in the composition.

11. The liquid ink composition of claim 10, wherein said storage stabilizer is included in the composition in an amount of 1 weight part to 3 parts by weight based on 100 parts by weight of liquid ink solids in said composition.

12. The liquid ink composition of claim 1, wherein said storage stabilizer is aluminum stearate.

13. A method of producing a liquid ink composition comprising the steps of:
   polymerizing a mixture of a carrier liquid, a (meth)acrylic monomer having 6 to 30 carbon atoms and a polymerization initiator to produce a graft stabilizer;
   polymerizing a mixture of said graft stabilizer, a carrier liquid, a (meth)acrylic monomer having 4 to 30 carbon atoms as a monomer for thermoplastic (co)polymeric core, and a polymerization initiator to produce an organosol; and
   mixing and milling said organosol, a colorant, a carrier liquid, a charge control agent, and a storage stabilizer dispersed in the carrier liquid to produce the liquid ink composition, wherein said storage stabilizer is a metal salt of a metal cation and an organic anion having 15 to 30 carbon atoms and said charge control agent is a metal carboxylate or metal sulfonate having 6 to 8 carbon atoms.

14. The method of claim 13, wherein said metal cation is selected from the group consisting of Ba (II), Ca (II), Mn (II), Zn (II), Zr (IV), Cu (II), Al (III), Cr (III), Fe (II), Fe (III), Sb (III), Bi (III), Co (II), La (III), Pb (II), Mg (H), Mo (III), Ni (II), Ag (I) Sr (II), Sn (IV), V (V), Y (III), and Ti (IV).

15. The method of claim 14, wherein said metal cation is Al (HI).

16. The method of claim 13, wherein said organic anion is a carboxylate or a sulfonate derived from a $C_{15}$ to $C_{30}$ fatty acid.

17. The method of claim 16, wherein said organic anion is a carboxylate derived from stearic acid.

18. The method of claim 13, wherein said storage stabilizer is aluminum stearate.

19. The liquid ink composition of claim 1, wherein said charge control agent is a metal sulfonate or carboxylate dispersed in the organosol.

20. The liquid ink composition of claim 1, wherein said charge control agent is zirconium octanoate.

21. The method of claim 13, wherein said charge control agent is a metal carboxylate or metal sulfonate having 6 to 8 carbon atoms dispersed in the organosol.

22. The method of claim 13, wherein said charge control agent is zirconium octanoate.

23. A liquid ink composition comprising:
a colorant;
a charge control agent;
an organosol wherein the charge control agent is incorporated into the organosol;
a carrier liquid; and
a storage stabilizer dispersed in the carrier liquid in an amount effective to stabilize the ink composition,
wherein said storage stabilizer is a metal salt of a metal cation and an organic anion having 15 to 30 carbon atoms.

24. The liquid ink composition of claim 1, wherein said charge control agent is a metal carboxylate or metal sulfonate not more than 15 carbon atoms.

* * * * *